United States Patent [19]

Treffinger et al.

[11] 4,420,072

[45] Dec. 13, 1983

[54] SWITCHING AND CONTROL DEVICE

[75] Inventors: Karl Treffinger, Oberderdingen; Günther Reimold, Eppingen, both of Fed. Rep. of Germany

[73] Assignee: E.G.O. Elektro-Gerate Blanc u. Fischer, Fed. Rep. of Germany

[21] Appl. No.: 251,937

[22] Filed: Apr. 7, 1981

[30] Foreign Application Priority Data

Apr. 25, 1980 [DE] Fed. Rep. of Germany ....... 3016032

[51] Int. Cl.[3] ........................ H01H 9/06; H01C 10/50; G05D 23/00

[52] U.S. Cl. ................................. 192/139; 200/17 R; 200/61.86; 219/414; 236/15 A; 338/198; 464/38

[58] Field of Search ........................... 192/139, 142 R; 219/412, 413, 414; 200/17 R, 18, 61.86; 338/198; 236/15 A; 464/38, 39

[56] References Cited

U.S. PATENT DOCUMENTS

| | | | |
|---|---|---|---|
| 1,833,774 | 11/1931 | Cronk | 200/61.86 |
| 2,935,591 | 5/1960 | Lee | 219/413 X |
| 3,971,904 | 7/1976 | Ward | 200/61.86 X |
| 4,111,358 | 9/1978 | Semple | 236/15 A |
| 4,340,806 | 7/1982 | Bergquist | 219/414 X |

*Primary Examiner*—Allan D. Herrmann
*Attorney, Agent, or Firm*—Steele, Gould & Fried

[57] ABSTRACT

A switching and control apparatus, comprising: a stepping switch with a rotatable controller barrel; a regulator having a rotatable setting shaft drivable by the controller barrel; a clutch, including a regulator-side coupling member fixed for rotation together with the setting shaft, effective over a predetermined range of angular regulator settings, in which the controller barrel drives the setting shaft, and ineffective at angular settings beyond the predetermined range, during which the setting shaft is not driven by the controller barrel; and, a spring-loaded arrangement for restraining rotational movement of the regulator-side coupling member during movement of the controller barrel beyond the predetermined angular range.

16 Claims, 8 Drawing Figures

SWITCHING AND CONTROL DEVICE

BACKGROUND OF THE INVENTION

1. Field of the Invention

The invention relates to the field of switching and control devices, particularly for baking ovens.

2. Description of Prior Art

Such combinations of switches and controls are also called UOG switches, because they make it possible to switch on underheat (temperature-controlled), overheat and grill positions. Thus, it is necessary to be able to control further switching positions of the cam switch at the end of the control range of the temperature control.

For this purpose, it is already known from German Pat. No. 1,615,225 to mount in the switch spindle of the cam switch a clutch sleeve with which the adjusting shaft of the control is connected in such a way that it does not rotate. A clutch spring is provided between the switch spindle and the sleeve and is tensioned on passing beyond the control range, so that the cam switch can be further rotated when, at the end of its control range, the control is blocked by a stop member. These devices have proved completely satisfactory, but require a metal sleeve in which the spring must be mounted. It would therefore be advantageous if such a UOG switch could be produced with lower manufacturing and assembly costs.

German Auslegesschrift No. 2,164,694 discloses such a UOG switch in which the clutch spring is placed between the two parts of a two-part controller barrel. A lug cam, which limits rotation, is also positioned between these two parts. Here again, manufacture and assembly are complicated.

SUMMARY OF THE INVENTION

The object of the invention is therefore to provide a switching and control device of the aforementioned type, which permits easier manufacture and assembly.

This object is achieved by a switching and control apparatus, comprising: a stepping switch with a rotatable controller barrel; a regulator having a rotatable setting shaft drivable by the controller barrel; clutch means, including a regulator-side coupling member fixed for rotation together with the setting shaft, effective over a predetermined range of angular regulator settings, in which the controller barrel drives the setting shaft, and ineffective at angular settings beyond the predetermined range, during which the setting shaft is not driven by the controller barrel; and, means for restraining rotational movement of the regulator-side coupling member during movement of the controller barrel beyond the predetermined angular range.

At the end of the control range of the control, which is limited by a stop member in the control or on the control-side clutch part of the switch, is provided a snap/slide clutch which permits the rotation of the controller barrel of the switch relative to the secured adjusting shaft of the control. The stopping of the clutch part on the control side ensures that the latter does not immediately start to turn back, which would eliminate the synchronization between the control and the switch. Since therefore, the clutch runs back more easily than the control, it is ensured that the clutch firstly reaches the position again at which it was disengaged and subsequently drives the control again, e.g. in positively engaged manner by a drive step.

The control-side clutch part is preferably locked by a spring-loaded detent, but this effect can also be produced by friction. The slot can be provided directly on the control-side connecting part in the vicinity of the switch or on the control, partial assistance being provided by the natural friction in the control.

However, preference is given to a construction with a snap/slip clutch, which can be considered as a compromise between a stop clutch and a slip clutch and which comprises two superimposed, preferably frontal clutch faces provided with cams or toothed in such a way that in the engaged state, i.e. when there is joint rotation of the control and switch spindles they engage with one another, while on disengaging they can be raised from one another counter to the tension of a spring which preferably axially compresses them and can rotate with respect to one another. This leads to a coupling action where, on passing beyond the coupling point (disengagement of the cams) the resistance to further rotation becomes relatively small again. On turning back, the clutch resiliently engages again, so that synchronization is necessarily restored again. In addition, in this position, a drive step acting in the turnback direction engages between the two clutch halves and ensures a positive coupling in this direction.

Further advantages and features of the invention can be gathered from the following description and the drawings. An embodiment of the invention is represented in the drawings and is described hereinafter.

DETAILED DESCRIPTION OF THE PREFERED EMBODIMENTS

Figure 1:
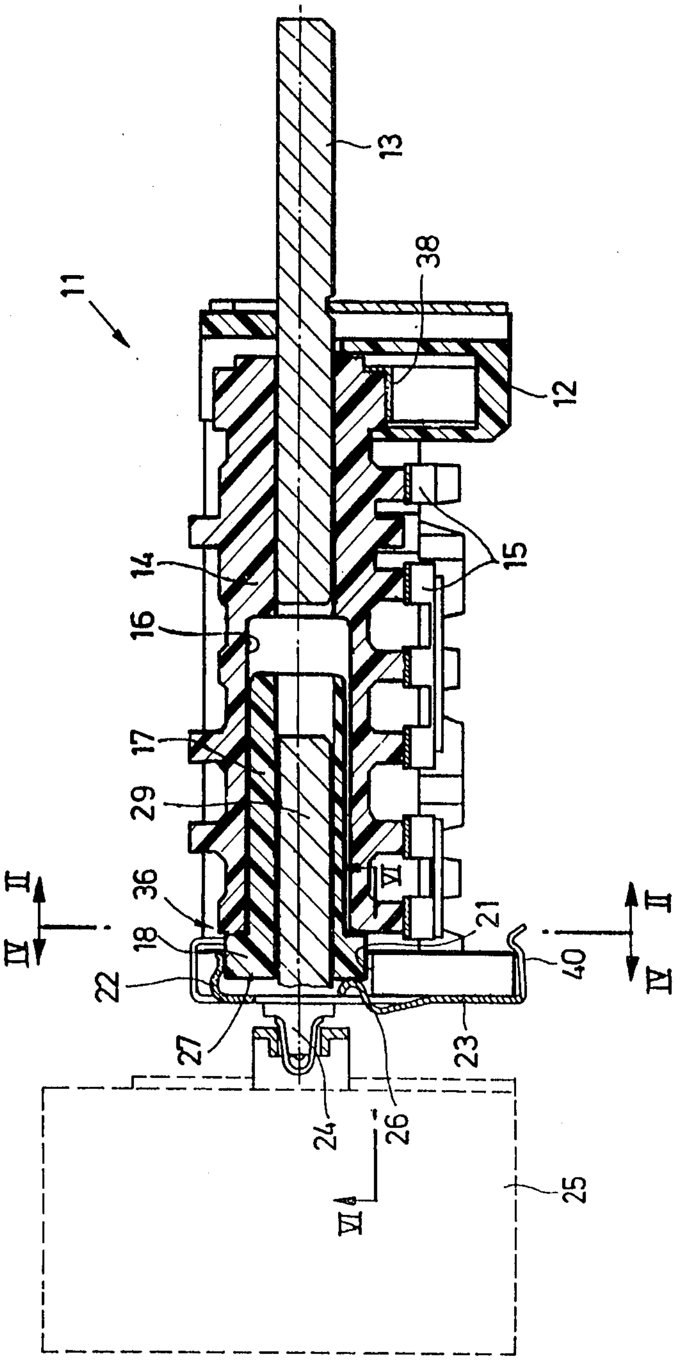
FIG. 1 is a longitudinal section through a front elevation of a switch with a temperature regulator connected thereto, according to this invention.
Figure 4:
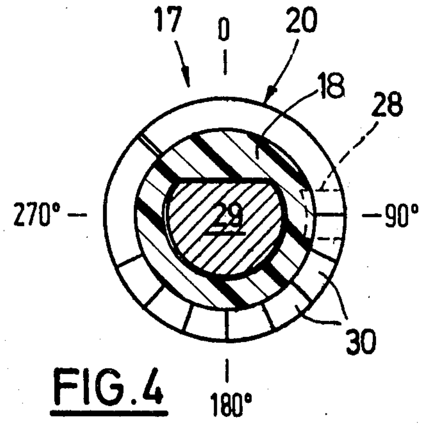
FIG. 4 is a plan view of the sleeve face which cooperates with the rear face, along line IV—IV of FIG. 1.
Figure 2:
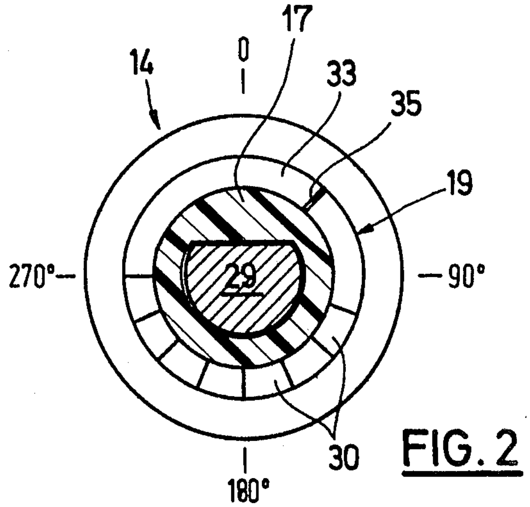
FIG. 2 is a view of the rear face of the controller barrel along the line II—II of FIG. 1.
Figure 5:
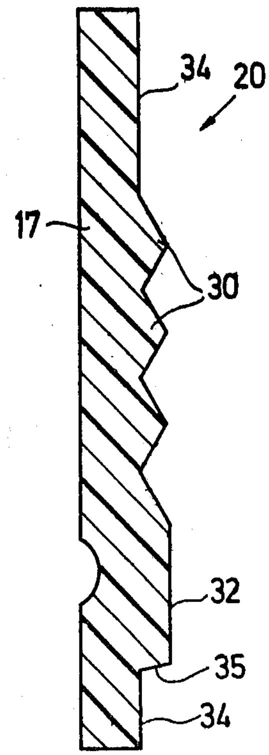
FIG. 5 is a development of the shape of the sleeve face.
Figure 3:
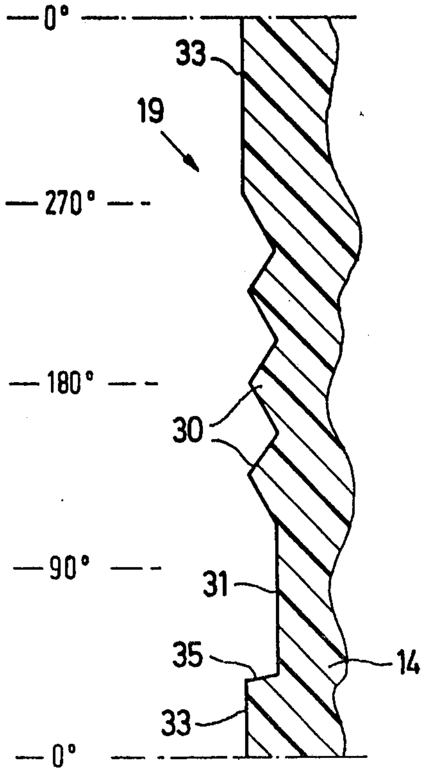
FIG. 3 is a development of the shape of the rear face.

The cam switch 11 shown in FIG. 1 comprises a switch casing 12 made from insulating material and in which is mounted a switch spindle 13, which drives a controller barrel 14. Controller barrel 14, which is made from insulating material, has a plurality of axially positioned cams, which actuate switch springs 15 in order to switch on and off various heating resistors, grill motors, lighting equipment and the like for an oven.

The controller barrel has at its operation-remote end a deep, central recess, which engages in a sleeve-like coupling member 17 and can rotate therein and to a limited extent can also be axially displaced therein. Following on its part which is guided in recess 16, the coupling member has a flange 18, whose inner face (coupling face 20) covers the operating-remote face (coupling face 19). The two coupling faces are shaped in a manner to be described hereinafter.

Flange 18 is positioned in a U-shaped recess 21 of switch casing 12 and forms therewith the rear bearing for the controller barrel. The controller barrel is secured in recess 21 by the projection 22 of a rear sheet metal plate 23 which engages over flange 18. Plate 23 has a multiple function. In addition to securing the controller barrel mounting in the radial direction, it also secures the latter in the axial direction. Furthermore, it has projections 24 for the non-rotary coupling of control 25, together with a leaf spring 26, cut therefrom in the form of a tongue which axially presses on the outer face 27 of coupling member 17 and consequently presses together the two coupling faces 19, 20. Face 27 contains a recess 28 (cf e.g. FIG. 7), in which the leaf spring 26 can engage. Plate 23 is fixed to casing 12 by means of spring detents 40. Control 25 has an adjusting shaft 29 received in non-rotary manner within clutch member 17.

FIGS. 2 to 5 show the shape of the two coupling faces. It is clear that the two shaped surfaces have a circular area on the face and are constructed in mirror-symmetrical manner to one another, so that the shaped surfaces engage with one another in the coupled position.

Each shaped surface comprises a plurality (three in the represented embodiment) of sloping triangular projections and recesses (cam 30), a portion 31 retracted with respect to the controller barrel 14 and which faces a projecting portion 32 on coupling member 17 or coupling face 20, as well as a portion 33 projecting from coupling face 19 of a controller barrel and which corresponds to a retracted portion 34 on the facing coupling face 20. There is a steep step 35 on both couplings faces 19, 20 between the projecting and retracted portions.

The operation of the clutch 36 formed between the controller barrel 14 and coupling member 17 will now be described in detail with reference to FIGS. 6 to 8.

Figure 6:
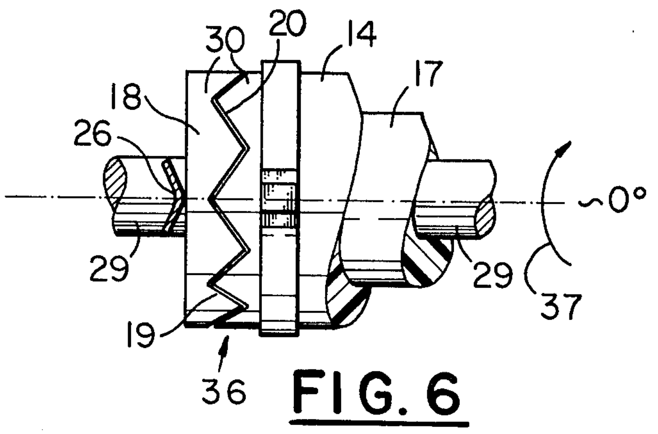
FIGS. 6 to 8 are views of the coupling gap between the sleeve and the drive roller, viewed along line VI—VI in FIG. 1 in various working positions.

FIG. 6 shows the clutch 36 in an engaged or effective condition in which the shaped surfaces, which correspond to one another in mirror-symmetrical manner engage on and into one another. This state is maintained from switch position 0° (off position) to the end of the control range of temperature regulator 25. This control range normally ends at approximately 270° in the rotation angle of the switch spindle 13, and therefore control shaft 29, which is synchronously coupled in this range. Leaf spring 26 runs on face 27 of coupling member 17 ensuring on the one hand the pressing together of coupling faces 19, 20 and on the other a certain desired locking of switch and control to prevent undesired adjustment.

Figure 7:
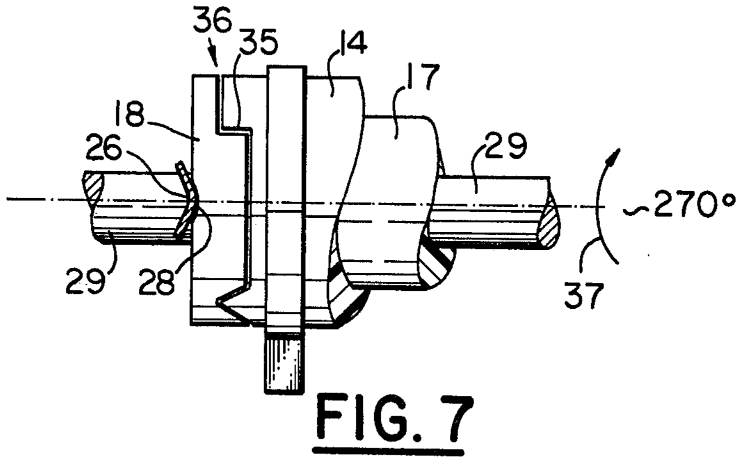

FIG. 7 shows the clutch 36 at the end of the control range (with a setting angle of approximately 270°). It can be seen that the clutch 36 is still engaged, i.e. bases 19, 20 still engage on one another, but the leaf spring 26 is resiliently inserted in recess 28, so that there is braking of coupling member 17. Normally, the angular range of rotation of control shaft 29 in the temperature regulator is limited by a stop member, so that this also ensures the stopping of coupling member 17.

Figure 8:
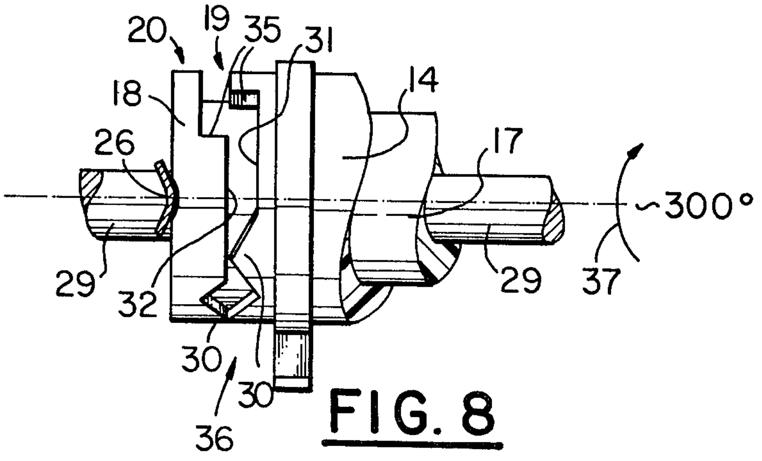

FIG. 8 shows that in the case of a further rotation between 270° and the end of the rotation range of switch spindle 13, clutch 36 is disengaged or ineffective. The inclined faces of cams 30 slide on one another and axially displace coupling member 17 counter to the tension of leaf spring 27 in such a way that faces 19, 20 no longer engage on one another in true-to-fit manner and instead are moved apart by the profile height of both profiles. Thus, in actual fact, the apices of cams 30 slide on faces 32, 33. The steep steps 35 are so positioned that on further rotation, step 35 on controller barrel 14 moves away from the corresponding step on coupling member 17. In this angular range of rotation (270° to shortly before 360°) contacts are opened or closed by the controller barrel 14 due to the movement of switch springs 15 without there being any movement of the regulating spindle 29 of the temperature regulator. The previously described setting has taken place in the clockwise direction, i.e. in the direction of arrow 37, viewed from the right in FIGS. 6 to 8. On rotating back counter to rotation direction 37, coupling face 19 of controller barrel 14 runs back to the coupling point (in the present embodiment 270°). It is pointed out the adjustment of the controller barrel relative to coupling member 17 involves a relatively easy motion after disengagement, following an initial resistance to the axial movement of member 17 counter to the tension of leaf spring 26. This is also the case on turning back, so that the locking action by the leaf spring 26 inserted in recess 28 is greater than the friction in the vicinity of clutch 36. This locking action by the resiliently inserted leaf spring can be supplemented or replaced by other frictional forces, e.g. in the temperature regulator or control.

Shortly before reaching the position of FIG. 7 (coupling point), the inclined faces of the triangular cam 30 again engage and leaf spring 26 presses the coupling sleeve to the right again until the position of FIG. 7 (engaged position) is again reached.

The two steep steps 35 once again engage on one another, so that now there is a necessary positive engagement of clutch 36 by means of which it is easy to remove leaf spring 26 from recess 28. A certain resistance can be detected, which descreases on rotating back further (FIG. 6). These resistance points are desired, so that, without reading the toggle markings, the user immediately detects the point at which the control range of the temperature regulator is exceeded.

We claim:

1. A switching and control apparatus, comprising:
a stepping switch with a rotatable controller barrel;
a regulator having a rotatable setting shaft drivable by the controller barrel;
clutch means, including a regulator-side coupling member fixed for rotation together with the setting shaft, effective over a predetermined range of angular regulator settings, in which the controller barrel drives the setting shaft, and ineffective at angular settings beyond the predetermined range, during which the setting shaft is not driven by the controller barrel; and,
means for restraining rotational movement of the regulator-side coupling member during movement of the controller barrel beyond the predetermined angular range.

2. The apparatus of claim 1, wherein the clutch means comprises a drive step which is effective in the turn-back direction.

3. The apparatus of claims 1 or 2, wherein the clutch means comprises two coupling faces, one on the regulator-side of the controller barrel and one on a sleeve forming the regulator-side coupling member.

4. The apparatus of claim 3, wherein the sleeve-like coupling member comprises a portion projecting into the hollow controller barrel and a flange, the regulator-side coupling face being formed on the flange.

5. The apparatus of claim 1, wherein the clutch means comprises cooperating sloping cams.

6. The apparatus of claims 3 or 4, wherein the coupling faces are axially movable relative to one another.

7. The apparatus of claim 6, further comprising a spring for axially pressing the coupling faces against one another.

8. The apparatus of claim 2, wherein the drive step comprises steep steps in the coupling faces which cooperate with one another.

9. The apparatus of claim 5, wherein the slopping cams comprise a plurality of interengageable triangularly-shaped teeth.

10. The apparatus of claim 5, wherein the cams cooperate to separate the coupling faces from one another.

11. The apparatus of claim 3, wherein the coupling faces comprise surface configurations which are mirror images of one another and which are capable of whole-surface engagement in the predetermined range of angular regulator settings in which the clutch means is effecitve.

12. The apparatus of claim 7, further comprising a rear sheet metal cover plate for the switch, the plate having a projecting tongue forming a leaf spring for pressing the coupling faces toward one another.

13. The apparatus of claims 7 or 12, wherein the spring forms the means for restraining rotational movement of the regulator-side coupling member.

14. The apparatus of claim 1, wherein the regulator-side coupling member has a recess formed therein, into which locking means are resiliently urged.

15. The apparatus of claim 1, wherein the clutch means provides less driving force at angular settings beyond the predetermined range than that force which is necessary to overcome the restraining means for the regulator-side coupling member.

16. The apparatus of claim 1, wherein the regulator-side coupling member and the setting shaft of the regulator are axially interengageable.

* * * * *

UNITED STATES PATENT AND TRADEMARK OFFICE

CERTIFICATE OF CORRECTION

PATENT NO. : 4,420,072

DATED : December 13, 1983

INVENTOR(S) : Treffinger et al.

It is certified that error appears in the above-identified patent and that said Letters Patent is hereby corrected as shown below:

Column 5, line 8, delete "slopping" and insert --sloping--.

Column 5, line 19, delete "effecitve" and insert --effective--.

Signed and Sealed this

*Twelfth* Day of *March 1985*

[SEAL]

*Attest:*

DONALD J. QUIGG

*Attesting Officer* *Acting Commissioner of Patents and Trademarks*